Patented Dec. 25, 1923.

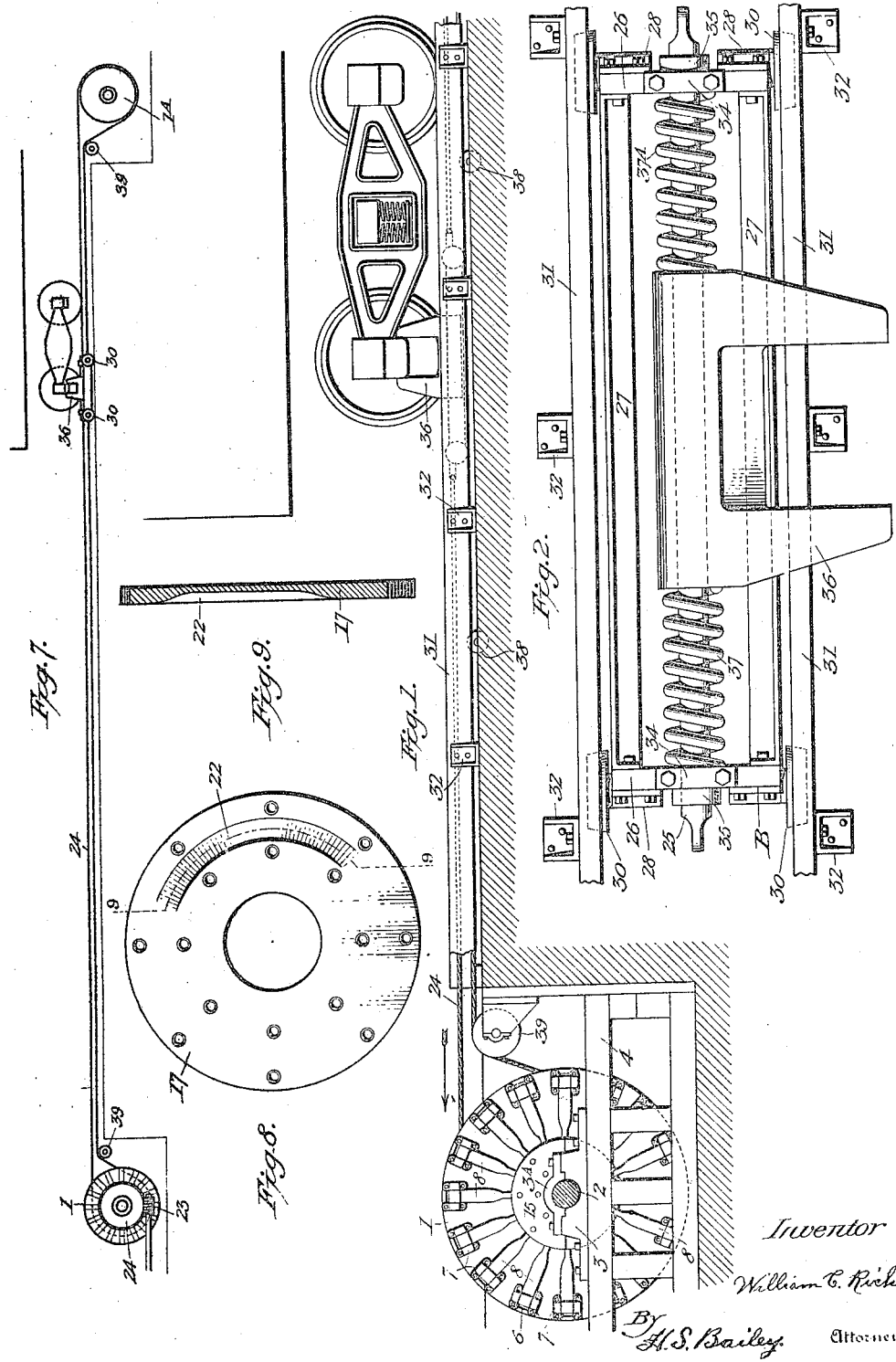

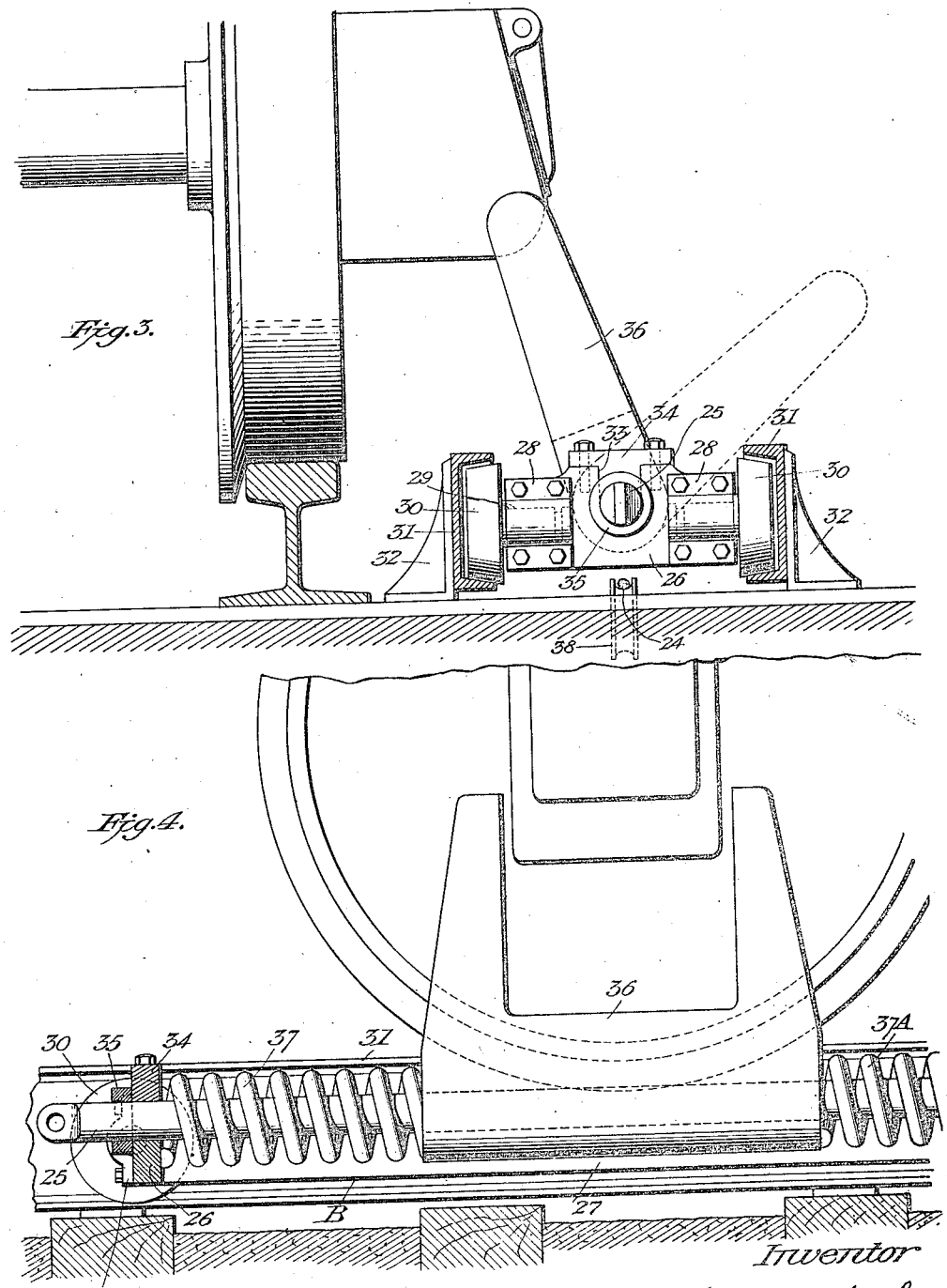

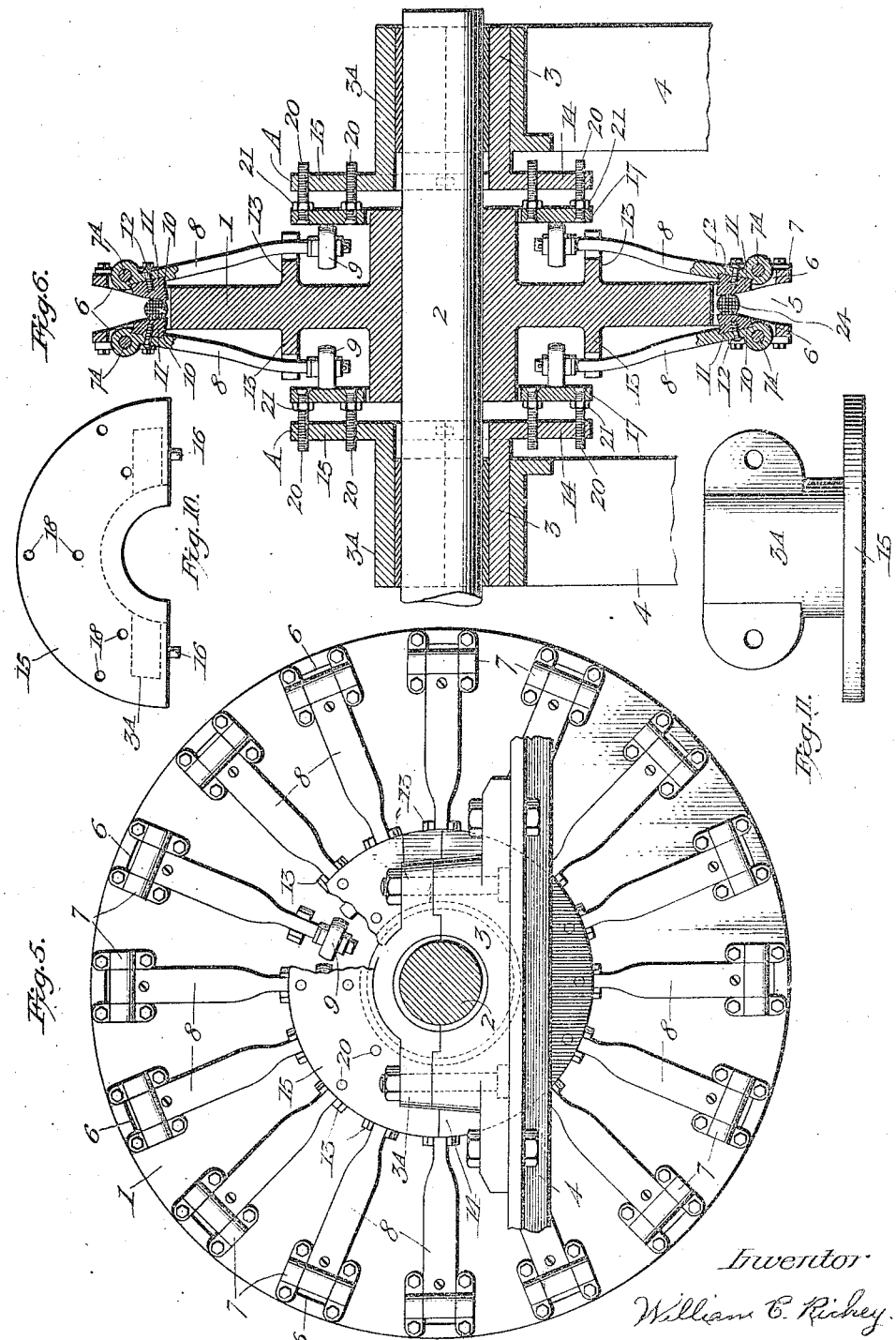

1,478,676

UNITED STATES PATENT OFFICE.

WILLIAM C. RICHEY, OF DENVER, COLORADO.

RAILWAY-CAR-HANDLING MECHANISM.

Application filed February 17, 1923. Serial No. 619,604.

*To all whom it may concern:*

Be it known that I, WILLIAM C. RICHEY, a citizen of the United States of America, residing at the city and county of Denver and State of Colorado, have invented a new and useful Railway-Car-Handling Mechanism, of which the following is a specification.

This invention relates to improvements in railway car handling mechanism and particularly for the handling or moving of cars over tipples, when the said cars are being loaded. The main object of the invention is to provide mechanism by which one or more cars can be moved by gradual stages, beneath a loading chute, so as to properly distribute the load throughout the length of the car.

Further, to provide mechanism by which cars may be moved by gradual stages beneath a loading chute and without the employment of a locomotive, the said mechanism being adapted to exert both a resilient starting pull and a resilient stopping action, whereby sudden jerking of the car and the corresponding strain upon the mechanism is eliminated.

Further, to provide a mechanism comprising a practically endless cable of any desired length, a power operated gripping sheave wheel for said cable and a truck operated by said cable having a spring-cushioned connecting yoke which is adapted to be detachably connected to the journal box of a car, whereby a single car or several cars which are coupled together, may be moved in gradual stages to facilitate the work of loading the said cars.

These objects are accomplished by the mechanism illustrated in the accompanying drawings in which—

Figure 1 is a side view of the improved car handling mechanism, showing the connecting yoke thereof in engagement with the journal box of a car truck.

Fig. 2 is a plan view of the endless-cable-operated truck having the connecting yoke which is adapted to engage the journal box of a car truck, a section of the track over which the said truck is drawn being also shown.

Fig. 3 is an enlarged end view of the truck and its tracks, and showing the connecting yoke in engagement with the car axle journal box.

Fig. 4 is a longitudinal sectional view of a portion of the truck shown in Fig. 3.

Fig. 5 is a side view of the endless cable-gripping sheave wheel, and cooperating elements.

Fig. 6 is a vertical sectional view of Fig. 5.

Fig. 7 is a diagrammatic side view showing the arrangement of the mechanism.

Fig. 8 is a side view of one of the adjustable track disks which hold the cable grippers in cable-gripping relation.

Fig. 9 is a sectional view on the line 9—9 of Fig. 8.

Fig. 10 is a front view of the semicircular half section of one of the supporting disks for one of the adjustable track disks, and Fig. 11 is a plan view of Fig. 10, showing the integral connection between the semicircular half disk, and the cap of one of the bearings which supports the shaft of the cable gripping sheave wheel.

Heretofore, it has usually been the practice, in loading cars with coal or freight of a like character, to run the cars onto a tipple or to a section of track extending beneath a loading chute, and to move the cars, manually, as they are loaded, by the use of pinch bars. This method is both slow and laborious, and when the grade is steep the car or cars are often moved by gravity— beyond the point of the loading chute when the brakes are released, and must be moved back again in the manner above mentioned.

The improved power-operative mechanism eliminates these objectionable features, and provides means by which a car can be engaged, moved at will, and released, without loss of time, and without sudden movement of the car and the consequent strain upon the mechanism.

Referring to the accompanying drawings: The numeral 1 indicates the improved cable gripping sheave wheel, 2 the shaft upon which the said wheel is rigidly mounted, and 3 the bearings for the shaft, which are secured upon supports 4 as shown, the said wheel being positioned below the level of the track bed over which the cars to be loaded pass, the highest point of the wheel being slightly above the level of the track bed, as will be understood by reference to Fig. 1. The wheel 1, is provided with an annular circumferential cable-receiving groove 5, and each side of the wheel is formed with a circular series of rectangular openings 6, which intersect the groove 5, the openings on one side being diametrically opposite the openings on the other side. Bearings 7 are bolted to the wheel, on each side of each rectangular opening 6 and in these bearings are supported pins 7ᴬ, upon which are mounted the outer ends of radially disposed gripper arms 8, the free inner ends of which terminate within a short distance of the hub of the wheel and are provided with rollers 9, which are held thereon in any suitable manner. The outer, or pivoted ends of the arms 8 lie partly within the openings 6, from which points they incline from the respective faces of the wheel, and the inner faces of these outer end portions are formed with dovetail grooves 10 in which are fitted blocks 11, which project inward through the openings 6, and into the cable receiving groove 5, and are held in the dove tail grooves 10 by screws 12, which pass through holes in the arms and into the blocks. The blocks 11 are adapted to grip the cable which lies within the groove 5 and are therefore of relatively soft metal, so that they will not cut or wear the cable. The wheel is provided, preferably, with sixteen pairs of these arms and their inner end portions, which are spaced from the face of the wheel 1, are supported in bifurcated guide lugs 13 which are formed on the faces of the wheel, and which prevent the arms from being moved out of radial lines. By reference to Fig. 6 it will be seen that inward pressure on the inner ends of the arms 8 will cause each cooperating pair of blocks 11 to grip the cable which lies between them, and this pressure against the inner ends of the arms is accomplished in the following manner:

Upon the inner end of each shaft bearing 3 is formed a semicircular plate 14, the straight edge of which is on a level with the axis of the bearing; and upon the inner end of each bearing cap 3ᴬ, is formed a semicircular plate 15, which adjoins the plate 14 and forms therewith a circular plate A, the axial center of which conincides with the axis of the shaft 2. The semicicular plates 14 and 15 are held in alinement with respect to each other, by dowel pins 16, which enter registering holes in the meeting edges of the plates, and the two circular plates A, thus formed, constitute supports for a pair of circular track plates 17, which are adjustably secured to the supports in the following manner:

The supports A are each provided with two circular rows of threaded holes 18 and the track plates 17 are also provided with corresponding holes 19, but the holes 19 are unthreaded and countersunk at their inner ends to receive the heads of bolts or screws 20, which are screwed into the holes 18 in the supports A, thereby securing the track plates 17 to the supports, as clearly shown in Fig. 6. The track plates 17, are in the form of flat rings which extend over the ends of the hub of the sheave wheel 1, and form tracks for the rollers 9 of the gripper arms 8. A space is defined between each support A and its track plate, and by turning the screws 20, the track plates 17 may be adjusted with respect to the supports and the screws are held against turning, after the desired adjustment of the track plates is determined, by jam nuts 21 on the said screws, which are screwed tightly against the outer faces of the said track plates. It will thus be seen that the track plates can be adjusted to bear against the rollers 9 with sufficient pressure to cause the blocks 11 to grip the cable passing between them, and draw on the cable as the sheave wheel 1 rotates. In operating either an endless cable 24, or a one whose ends are secured to the opposite ends of a truck or other object which is to be drawn back or forth, it is necessary that the lower lap of the cable be released at a suitable point in the rotation of the wheel, when the upper lap is being drawn upon, and that the upper lap of the cable be released at a suitable point in the rotation of the wheel, when the underlap is being drawn upon, and this is accomplished in the following manner:

A substantially semicircular groove 22 is formed in the inner face of each track plate, in the path travelled by the rollers 9, the said grooves gradually increasing in depth from their ends to points representing their maximum depth, as shown by Figures 8 and 9. The rollers 9 successively enter the grooves, as the wheel 1 rotates, and the pressure on them and consequently on the gripper blocks, is withdrawn, thus permitting the blocks to release either the upper or lower lap of the cable, at a given point in the rotation of the wheel. The improved gripping wheel may be operated in any way desired, but I preferably operate it by means of a power driven worm pinion 23, which operates a worm gear 24, which is rigidly mounted on the shaft 2, as shown by the diagram, Fig. 7. The cable 24 passes around the grip wheel 1 at one terminal, and around a pulley 1ᴬ at the other terminal, and the ends of the cable are secured to the opposite ends of a draw bar 25, which passes through cross bars 26, which form the end members of a car-operating truck B, and which are connected by longitudinal side bars 27, which, as shown in Fig. 2, are angle bars.

Each cross bar 26 is provided with bearings 28 in which are mounted stub axles 29 upon which are rigidly secured track wheels 30 having slightly tapered tread faces, and these wheels travel upon the lower flanges of tracks 31, which are in the form of channel bars, and which run parallel with, and close to the railway tracks over which the cars to be loaded are passed.

The tracks 31 permit free travel of the truck both back and forth, but hold the truck against displacement when the same is connected to a car for the purpose of moving the same, as will hereinafter more fully appear. The tracks 31, are bolted to brackets 32, which are in turn bolted to the rail ties, as shown.

The draw bar 25, rest in recesses 33, which are formed in the end bars 26 of the truck, and are held therein by caps 34 which are bolted to the said end bars, as shown in Fig. 3. Collars 35 are welded upon the draw bar 25 which bear against the outer faces of the end bars 26, and thus prevent sliding movement of the draw bar in the said end bars. Slidably and rotatably mounted on the draw bar, midway of its length, is a yoke shaped coupler 36, which is adapted to engage the journal box of a car truck to move said car, and between the ends of the coupler, and the end bars 26, are interposed heavy coil springs 37, and 37$^A$ respectively, which normally hold the coupler 36, at a point midway between the two end bars 26, and also serve to cushion the initial pull on the car operating truck, so as to relieve the strain on the gripping wheels.

In operation, as many yards of the track 31 are laid, as may be necessary, and at the loading terminal of these tracks, is mounted the pulley 1$^A$, while at the other terminal of the track is mounted the cable gripping wheel 1, the shafts of these wheels being below the level of the road bed, so that the highest points of the wheels are slightly above the level of the road bed, as will be understood by reference to Figs. 1 and 7. The cable 24 is then passed over and around the gripping wheel 1 and the pulley 1$^A$ and the lower lap of the cable, which lies between the tracks 31, is supported at intervals on rollers 38, and at the ends of the track are mounted rollers 39 over which the lower lap passes to the gripping wheel 1 and to the pulley 1$^A$. The two ends of the cable are secured to the opposite ends of the draw bar 25 of the car operating truck B, and when the wheel 1 is rotated the cable which is gripped by the said wheel is drawn upon and the truck B is thereby propelled.

As before stated, the track 31 over which the truck B is drawn, are laid parallel with and close to the railway tracks on which the cars to be loaded pass. A car to be loaded is moved to a point on the main track opposite the loading chute, and the truck B is connected thereto by swinging the coupler 36 into engagement with a journal box of one of the wheel axles of the said car.

As the material is deposited in the car the car is gradually moved forward by the action of the truck B in order that the load may be equally distributed and when the car is filled it is moved forward far enough to make room for another car which is coupled to the first car in the usual manner, and thus a number of cars may be loaded, and gradually moved forward by the truck B which is coupled to the first car, and which is moved by cable 24. When the cable is drawn upon in the direction of the arrow, Fig. 1, the initial stress is sustained by the coil spring 37$^A$, which is thereby compressed by the coupler 36 until the force of the pull is communicated to the car, the initial forward movement of the truck B, causing the coupler 36 to slide on the drawbar 25, thereby compressing the spring 37$^A$, as stated. In stopping a car, the initial force is directed against the coil spring 37, when the cable is brought to a stand still, thus relieving the strain upon the cable. The cars being loaded, are under control at all times, and can be moved as slowly or as rapidly as may be necessary, and any undue strain on the cable, such as may be caused by the bumping of one car against a car or cars which are coupled to the truck B, will cause the cable to slip through the gripping blocks 11, thus relieving the strain upon the cable and the gripping wheel; the spring 37, or 37$^A$, as the case may be, also cooperating in absorbing the shock. When the truck B has been moved to the end of the tracks farthest from the loading terminal, the gripping wheel 1 is reversed and the truck is then moved in the opposite direction, or back to the loading terminal.

Having described my invention, what I claim as new and desire to secure by Letters Patent, is:

1. In car handling mechanism of the character described, the combination with a pulley, a cable gripping wheel distant from said pulley and a cable which passes over and around said pulley and said gripping wheel; of tracks parallel with the run of said cable, a truck on said tracks having a draw bar to the ends of which the respective ends of said cable are secured and a coupler device slidably mounted on said draw bar centrally of its length and spring cushioned in each direction of its movement, which is adapted to be connected to a car to move the same.

2. In car handling mechanism of the character described, the combination with a track section which parallels a railway track, of a pulley mounted at one end of said track section, a power operated cable gripping wheel mounted at the opposite end of said track section, a truck mounted on said track section having a longitudinal draw bar, a yoke shaped coupler centrally and slidably mounted on said draw bar, coil springs on said draw bar which are interposed between the ends of said coupler and the ends of the truck respectively, and a cable which passes around said pulley and said cable gripping wheel, its ends being secured respectively to the opposite ends of said draw bar, said coupler being adapted to be connected to the axle journal box of a car on said railway track, to move said car.

3. In car handling mechanism of the character described, the combination with a track section, which is adjacent to and parallels a railway track, the rails of said track section being of channel bar form; of a pulley mounted at one end of said track section, a power operated cable gripping wheel mounted at the opposite end of said track section, a truck having wheels which lie within said channel tracks and run upon the same, said truck having a central longitudinal drawbar, a yoke shaped coupler centrally and slidably mounted on said draw bar, and spring cushioned in each direction of its movement, a cable which is passed around said pulley and said cable gripping wheel, its ends being secured respectively to the opposite ends of said draw bar, said coupler being adapted to be connected to the axle journal box of a car on said railway track to move said car.

In testimony whereof I affix my signature in presence of two witnesses.

WILLIAM C. RICHEY.

Witnesses:
  G. SARGENT ELLIOTT,
  ELIZABETH SMITH.